United States Patent
Wu et al.

(10) Patent No.: US 11,703,865 B2
(45) Date of Patent: Jul. 18, 2023

(54) AERIAL OPERATION SUPPORT AND REAL-TIME MANAGEMENT

(71) Applicant: SZ DJI TECHNOLOGY CO., LTD., Shenzhen (CN)

(72) Inventors: Xumin Wu, Shenzhen (CN); Guang Yan, Shenzhen (CN); Zhuang Feng, Shenzhen (CN); Meng Hu, Shenzhen (CN); Zefei Li, Shenzhen (CN); Mingxi Wang, Shenzhen (CN); Renli Shi, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 109 days.

(21) Appl. No.: 17/328,965

(22) Filed: May 24, 2021

(65) Prior Publication Data
US 2021/0333794 A1    Oct. 28, 2021

Related U.S. Application Data

(63) Continuation of application No. 16/238,900, filed on Jan. 3, 2019, now Pat. No. 11,016,488, which is a
(Continued)

(51) Int. Cl.
*G05D 1/02* (2020.01)
*G01C 23/00* (2006.01)
(Continued)

(52) U.S. Cl.
CPC ............ *G05D 1/0202* (2013.01); *B64C 1/16* (2013.01); *B64C 39/024* (2013.01); *B64D 1/16* (2013.01);
(Continued)

(58) Field of Classification Search
CPC ...... G05D 1/0202; B64C 1/16; B64C 39/024; B64C 2201/128; B64C 2201/141;
(Continued)

(56) References Cited

U.S. PATENT DOCUMENTS

2010/0017046 A1    1/2010   Cheung et al.
2021/0304395 A1*   9/2021   Subramanian ......... G06V 20/17

FOREIGN PATENT DOCUMENTS

CN    101395628 A    3/2009
CN    102789232 A    11/2012
(Continued)

OTHER PUBLICATIONS

Xianlin Liu et al., "Principles and Technology of Large-area Array Digital Aerial Photography", Henan Science and Technology Press, Jul. 2013, p. 85-91.
(Continued)

*Primary Examiner* — Brian P Sweeney
(74) *Attorney, Agent, or Firm* — Anova Law Group, PLLC

(57) ABSTRACT

A method for supporting aerial operation over a surface includes obtaining a three-dimensional (3D) representation of the surface; converting the 3D representation of the surface to a two-dimensional (2D) representation of the surface; obtaining a 2D flight path of the aircraft based on the 2D representation of the surface; converting the 2D flight path to a 3D flight path including location coordinates; and controlling the aircraft to conduct a flight mission following the 3D flight path.

20 Claims, 15 Drawing Sheets

Related U.S. Application Data continuation of application No. PCT/CN2016/088304, filed on Jul. 4, 2016.

(51) Int. Cl.
  *G08G 5/00* (2006.01)
  *G08G 5/02* (2006.01)
  *B64C 1/16* (2006.01)
  *B64C 39/02* (2023.01)
  *B64D 1/16* (2006.01)
  *B64U 101/60* (2023.01)

(52) U.S. Cl.
  CPC ............ *G01C 23/00* (2013.01); *G08G 5/006* (2013.01); *G08G 5/0034* (2013.01); *G08G 5/0039* (2013.01); *G08G 5/0056* (2013.01); *G08G 5/0069* (2013.01); *G08G 5/0086* (2013.01); *G08G 5/025* (2013.01); *B64U 2101/60* (2023.01); *B64U 2201/10* (2023.01)

(58) Field of Classification Search
  CPC ........ B64D 1/16; G01C 23/00; G08G 5/0034; G08G 5/0039; G08G 5/0056; G08G 5/006; G08G 5/0069; G08G 5/0086; G08G 5/025
  See application file for complete search history.

(56) References Cited

FOREIGN PATENT DOCUMENTS

| | | |
|---|---|---|
| CN | 103412574 A | 11/2013 |
| CN | 103412575 A | 11/2013 |
| CN | 103499973 A | 1/2014 |
| CN | 103592947 A | 2/2014 |
| CN | 103679774 A | 3/2014 |
| CN | 103697896 A | 4/2014 |
| CN | 103699135 A | 4/2014 |
| CN | 103713642 A | 4/2014 |
| CN | 103950540 A | 7/2014 |
| CN | 104049625 A | 9/2014 |
| CN | 104386258 A | 3/2015 |
| CN | 104503464 A | 4/2015 |
| CN | 104808660 A | 7/2015 |
| CN | 104823018 A | 8/2015 |
| CN | 104881037 A | 9/2015 |
| CN | 104932525 A | 9/2015 |
| CN | 105116913 A | 12/2015 |
| CN | 105159319 A | 12/2015 |
| CN | 105449876 A | 3/2016 |
| CN | 105556408 A | 5/2016 |
| CN | 105652864 A | 6/2016 |
| WO | 2014179482 A1 | 11/2014 |
| WO | 2016074628 A1 | 5/2016 |
| WO | 2016078093 A1 | 5/2016 |

OTHER PUBLICATIONS

Guangrong Shen et al., "Information Science of Resources and Environment (2nd Edition)", Shanghai Jiaotong University Press, Jun. 2016, p. 90.

Chonghao Yang, et al., Construction Engineering Survey, Jul. 2015, pp. 4-9, Yellow River Water Conservancy Publishing House, China.

Gang Wan, et al., Unmanned Aerial Vehicle Surveying and Mapping Technology and Application, pp. 88-89, Dec. 2015, China Surveying, China Mapping and Surveying Press, China.

The World Intellectual Property Organization (WIPO) International Search Report and Written Opinion for PCT/CN2016/088304 dated Mar. 31, 2017 8 Pages.

The World Intellectual Property Organization (WIPO) International Search Report for PCT/CN2016/092398 dated Apr. 12, 2017 8 Pages.

* cited by examiner

Real-Time Power Supply Refilling Operation

AERIAL OPERATION SUPPORT AND REAL-TIME MANAGEMENT

CROSS-REFERENCE TO RELATED APPLICATIONS

This application is a continuation of U.S. application Ser. No. 16/238,900, filed on Jan. 3, 2019, now U.S. Pat. No. 11,016,488, which is a continuation of International Application No. PCT/CN2016/088304, filed on Jul. 4, 2016, the entire contents of both of which are incorporated herein by reference.

BACKGROUND

An unmanned aerial vehicles (UAV), often referred to as a drone, is an aircraft without a human pilot aboard. The flight of UAVs may be controlled with various kinds of autonomy, including with a remote control from an operator, or fully autonomously by onboard computers. Increased autonomy for flight planning is useful for the application of UAV in a broader field. While much of the attention regarding UAV has focused on recreational photography, sports and delivery, there is also increased interest in using UAV in research, manufacturing and agriculture.

SUMMARY

Systems, computer-readable media and methods are provided that may be useful for aerial operation support and management. One aspect of the aerial operation support includes planning a flight for an aircraft, which planning can be adjusted as needed. The planning and adjustment may take into consideration the need of supplying power to the aircraft or coordinating the actions of multiple aircrafts.

One illustrative method described in the present disclosure that may be useful for supporting aerial operation over a surface entails obtaining a representation of the surface that comprises a plurality of flight sections and identifying, by a processor suitably programmed, a flight path that allows an aircraft, when following the flight path, to conduct an operation over each flight section.

Another illustrative method that may be useful for supporting aerial entails instructing an aircraft to fly along a flight path over a surface, and making an adjustment to the flight path, wherein the adjustment is selected from the group consisting of avoiding an obstacle, adapting to a change of an environmental condition, receiving a supply, and the combination thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

Systems and methods are provided, in some embodiments, for aerial operation support and management. One aspect of the aerial operation support includes planning a flight for an aircraft, which planning can be adjusted as needed. The planning and adjustment may take into consideration the need of supplying power to the aircraft or coordinating the actions of multiple aircrafts. In some instances, the aircrafts are unmanned aerial vehicles (UAV).

Planning for a flight (e.g., designing a flight path) can be useful for certain automated functions of an aircraft, such as conducting a geological survey, taking aerial photographs, periodic examination of an agricultural or forestial field, or spraying pesticides, seeds, nutrients or chemical fire extinguisher, without limitation. The flight is typically above a surface, which is typically a surface on the ground, including relatively plain grounds or hills, but can also be on a body of water, a building, a ship, or any geographical or artificial structure.

Figure 1A:
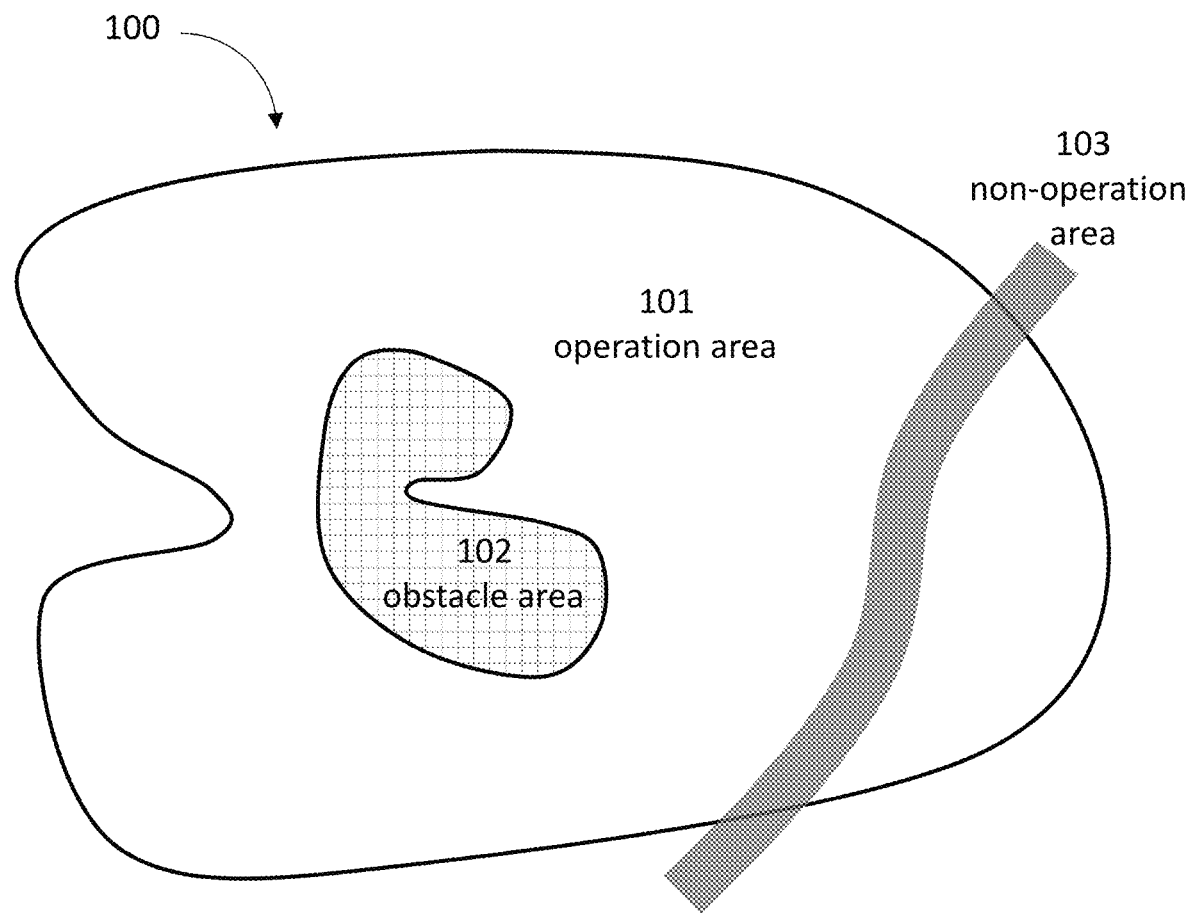
FIG. 1A illustrates a surface (100) that includes one or more operation areas (101) and optionally a non-operation area (103) and an obstacle area (102)

A surface, such as the surface 100 illustrated in FIG. 1A, may at least include an area above which the automated function (also referred to as "operation") is desired. Such an area may be referred to as an "operation area" (101). A surface may include one or more such operation areas. In addition, a surface may include one or more non-operation areas (e.g., 103) which allow the aircraft to fly over, but does not require the operation. A non-limiting example is a river crossing an agricultural field for which pesticide spray is being planned.

In some instances, the surface may also include one or more obstacle areas (102) which the aircraft may need to avoid. Non-limiting examples include a hill, a tower and a tall tree within an agricultural field. In some instances, the surface includes at least an operation area and at least a non-operation area. In some instances, the surface includes at least an operation area and at least an obstacle area. In some instances, the surface includes at least an operation area, at least a non-operation area, and at least an obstacle area.

Information of the surface, in some instances, is needed to plan the flight. The information that represents the surface may be graphic representation of the edges and points of the area with suitable description, or global positioning system (GPS) coordinates. As the surface can be flat or include slopes or other various shapes, the representation can be two-dimensional or three-dimensional depending on the situation. Even when the surface is flat, given the geographic shape of the earth, the surface's representation can still be three-dimensional if the surface is relatively large.

A graphic representation of the surface can be obtained by a variety of methods. In one example, the aerial survey of the surface can be conducted to determine the locations of points and edges that define the surface. In some instances, the aerial survey is conducted with an aircraft equipped with a real time kinematic (RTK) receiver. In connection with the RTK receiver, a RTK base station can be located on a nearby ground that is in electronic communication with the RTK receiver. The base station can include components for receiving location data (e.g., from GPS satellite), and transmitting the location of the base station as well as a carrier waveform to the RTK receiver. The RTK receiver can then integrate its own location, the location of the base station, and a phase differential derived from the waveform to precisely calculate its own location. With such high-precision location data, the aircraft can conduct a survey with high accuracy.

Each operation over the surface may have a desired altitude and, associated with the altitude (or height), a width of coverage ("coverage width"). For instance, when taking aerial pictures, depending on the desired resolution, the aircraft can fly at a suitable altitude. At that altitude, a camera with a particular lens covers a maximum width on the surface. Likewise, when an aircraft sprays a pesticide on an agricultural field, depending on the altitude and the mechanism of the sprayer, a spray width can be determined.

Taking the coverage width as an input, the surface may be divided into a plurality of sections ("flight sections"), which collectively cover all the desired operation areas. Overlapping is allowed and can even be important in some instances. For example, when spraying pesticide, it is important to include certain level of overlapping to avoid leaving areas not sprayed. Pests can quickly grow in the unsprayed area and, when there are a sufficient number of pests, grow over to other areas. In some embodiments, the overlapped width is at least 1%, 2%, 3%, 4%, 5%, 6%, 7%, 8%, 9% or 10% of the width of the neighboring flight section. In some embodiments, the overlapped width is not more than 5%, 10%, 15%, 20% or 25% of the width of the neighboring flight section.

In addition to allowing overlapping, or alternatively, the coverage width of each section can be selected to be slightly narrower than what the operation can actually cover, to maximize the possibility that the entire width is covered. For instance, spraying a pesticide from a particular altitude, if the spraying can cover a width ("operation width") of 1 meter, the coverage width of the flight section can be selected as 0.9 meter. In accordance with one embodiment of the disclosure, therefore, the coverage width of a flight section is at least 1%, 2%, 3%, 4%, 5%, 6%, 7%, 8%, 9% or 10% narrower than the operation width. In some instances, the coverage width of a flight section is no more than 5%, 10%, 15%, 20% or 25% of the operation width.

In some instances, the flight sections cover the operation areas. In some instances, the flight sections cover both operation areas and non-operation areas. In some instances, the flight sections do not cover the obstacle areas.

Once the flight sections are determined, a flight path can be ascertained according to the desired altitude. In some instances, the flight path is a line or a collection of lines above the surface at a substantially constant altitude. In some instances, the flight path, while viewed from above, fall into the middle of the flight section. Nevertheless, considering the slope and/or environmental conditions (e.g., light, wind, and temperature), the flight path does not need to be in the middle. Further, as discussed in more details below, the flight path can be adjusted in real-time depending on a change of one or more environmental conditions.

In some instances, it is helpful to convert a three-dimensional representation of a surface to two-dimensional space to facilitate computation. A three-dimensional representation of a surface may include points that differ from each other with respect to coordinates on all three dimensions. Also, edges that connect the points may be straight lines or curves. In a two-dimensional representation of a surface, on the other hand, all points are on a same plane, simplifying the determination of flight sections and flight paths.

Once a two-dimensional flight path is determined, it can be converted back to three-dimensional. A representation of the surface may include parameters such as definition of edges for the operation areas (operationAreaEdge), and optionally edges for the non-operation areas (nonOperationAreaEdge) or obstacle areas (obstacleEdge).

Figure 2:
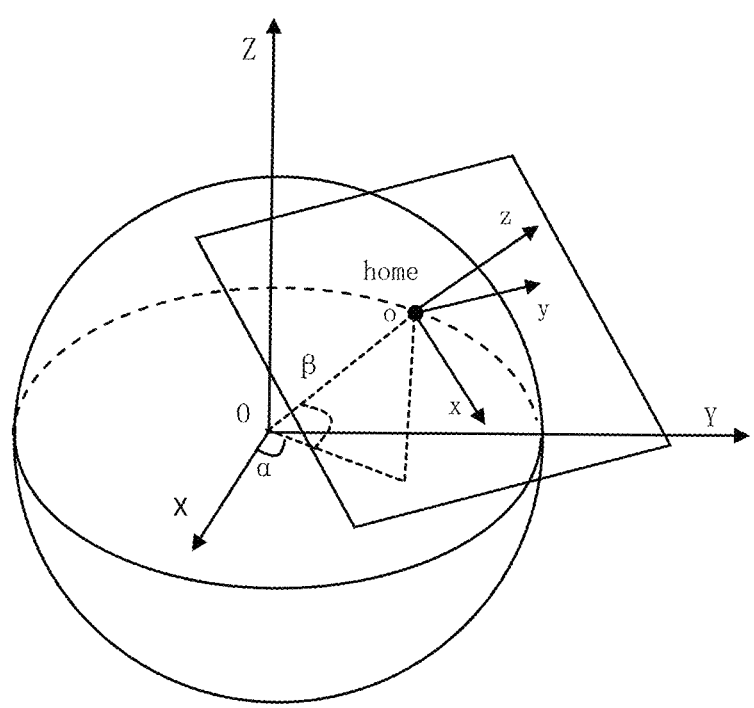
FIG. 2 illustrates conversion of a three-dimensional surface to a two-dimensional representation.

Before the conversion, it may be useful to also identify a reference point, which may be where a flight starts but may also just be for reference purposes. This reference point is referred to as a home point (homePoint) as illustrated as "home" in FIG. 2. With reference to FIG. 2, a non-limiting example of a method of converting the three-dimensional representation to two-dimensional entails projecting the three-dimensional representation to a plane that is perpendicular to a line that connects the home point (o) to the center of the earth (O).

As illustrated in FIG. 2, a three-dimensional coordinate system (OXYZ) can be used as a reference system where O represents the center of the earth. Another system, oxyz, is established based upon the home point (o). The plane defined by oxy is a plane that is perpendicular to the line o-O. Here, the home point (o) has a longitude of $\alpha$ and latitude of $\beta$. For a point (p1) that has a GPS position of p1(latitude, longitude), its OXYZ coordinates, p2(X, Y, Z), can be calculated as:

set TO_RANDIAN=$\pi$/180.0;

$X=\cos(\beta*\text{TO\_RADIAN})*\cos(\alpha*\text{TO\_RADIAN})$;

$Y=\cos(\beta*\text{TO\_RADIAN})*\sin(\alpha*\text{TO\_RADIAN})$; and $Z=\sin(\beta*\text{TO\_RADIAN})$.

The oxyz coordinates, p3(x, y, z), can then be obtained by rotating the OXYZ coordinates by $-\alpha$ degrees around the OZ axis and by $-(90-\beta)$ degrees around the OX axis. Finally, deletion of the z coordinate from p3(x, y, z) gives rise to the two-dimensional position of the point, p3(x, y).

From the two-dimensional representation (or the three-dimensional representation as the case may be), a working dimension (or working direction) can be designated, along with a perpendicular, side dimension (or side direction). Determination of the working dimension may take into consideration a variety of factors. One such factor is the size of the surface relative to the distance the aircraft can travel without the need to refill or replace power supply. In some instances, the dimensions are chosen such that the maximum length of projection of the surface to the working dimension is minimized. In some instances, the dimensions are chosen such that the maximum length of projection of the surface to the side dimension is maximized. In some instances, the working dimension and side dimension are chosen so that the central dividing line of the surface substantially aligns with one of the dimensions.

Figure 1B:
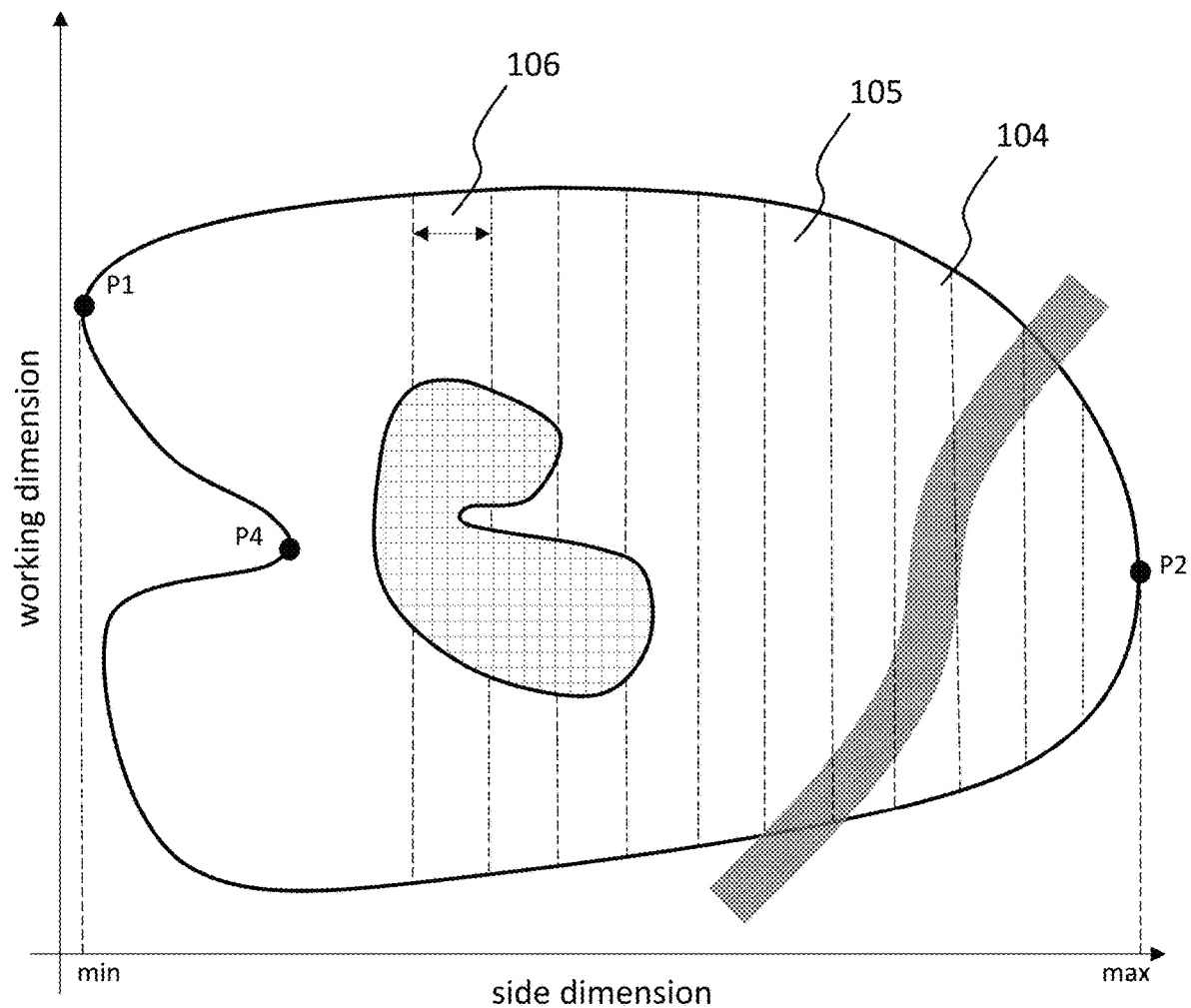
FIG. 1B illustrates the division of the operation area into multiple parallel strips with equal width.

In FIG. 1B, the working dimension and side dimension are chosen such that a central dividing line that approximately travels from P4 to P2 is parallel to the side dimension. With the definition of the dimensions, a max point (P2) and a min point (P1) can be identified along the side dimension. Accordingly, the area between min and max defines the areas that flight sections need to cover. The flight sections, as illustrated as 104 and 105 in FIG. 1B, are aligned with the working dimension and evenly distributed along the side dimension.

The surface can be divided into a plurality of parallel stripes (e.g., 104 and 105 in FIG. 1B) from min to max. Each stripe has a coverage width 106. Portions of the strips (represented by dotted lines in FIG. 1B) that allow flight are flight sections. In a simple situation, the surface has a regular shape (e.g., a rectangular) and includes no obstacle or non-operation areas. In this simple example, a flight path can be identified by connecting flight paths between neighboring stripes, or flight sections.

In some instances, it may be beneficial to split a stripe into two or more flight sections when the surface may include an obstacle area or concave. It then warrants consideration on how the flight paths from the flight sections are connected to minimize non-operational flight to get around the obstacle areas. Non-operational flight is flight during which no operation is carried out. An example solution is illustrated in FIG. 1C-1G.

As shown in FIG. 1B, some stripes are interrupted by the obstacle area to form two or more flight sections. For these stripes, each of them has an even number of intersections with the boundary of the surface or the boundary of the obstacle areas. All these intersection points are collected and ordered according to their inner product space against the working dimension, as [0 n−1]. Then [0 1], [2 3], [4 5] . . . [n−2 n−1] represent flight sections and [1 2], [3 4], [5 6], etc. represent fragments within the obstacle areas.

In accordance with various embodiments, the system can identify a suitable overall flight path by connecting the flight sections in a manner to minimize non-operational flight outside these flight sections.

Figure 1C:
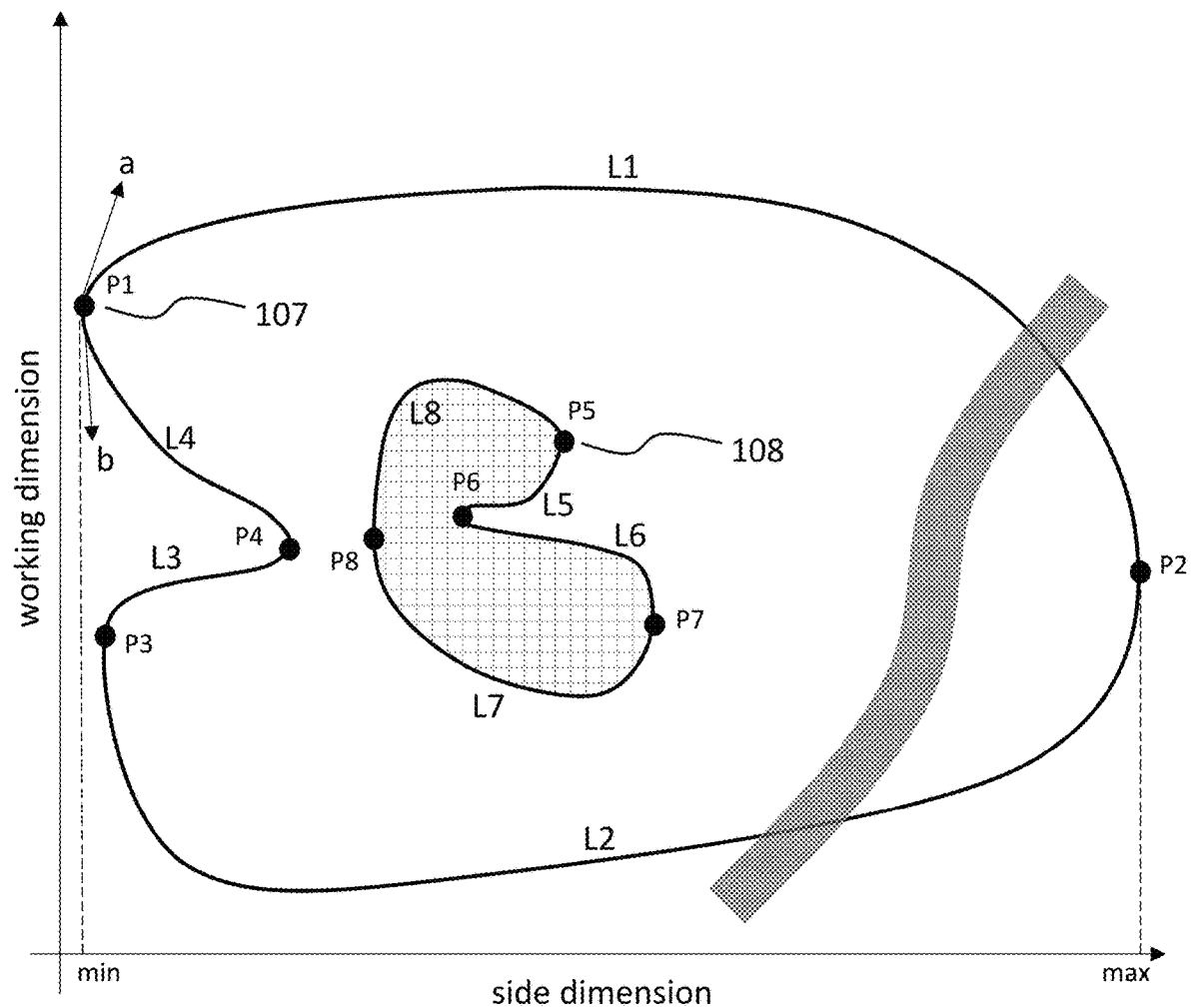
FIG. 1C illustrates the identification of tangential points the partitioning the edges of the surface and the obstacle area.

As discussed above, each surface is represented by a number of edges that define the operation areas, and where applicable, edges that define the non-operation areas and obstacle areas. Along these edges, "tangential points" may be identified at points of the edges where the slope is perpendicular to the side dimension (i.e. parallel to the working dimension). For instance, in FIG. 1C, these tangential points include P1-P8. As illustrated in FIG. 1C, for P1 (107), a slope (a) that is immediately above it and a slope (b) that is immediately below it both point to the right hand side, indicating that P1 is a tangential point.

Figure 1D:
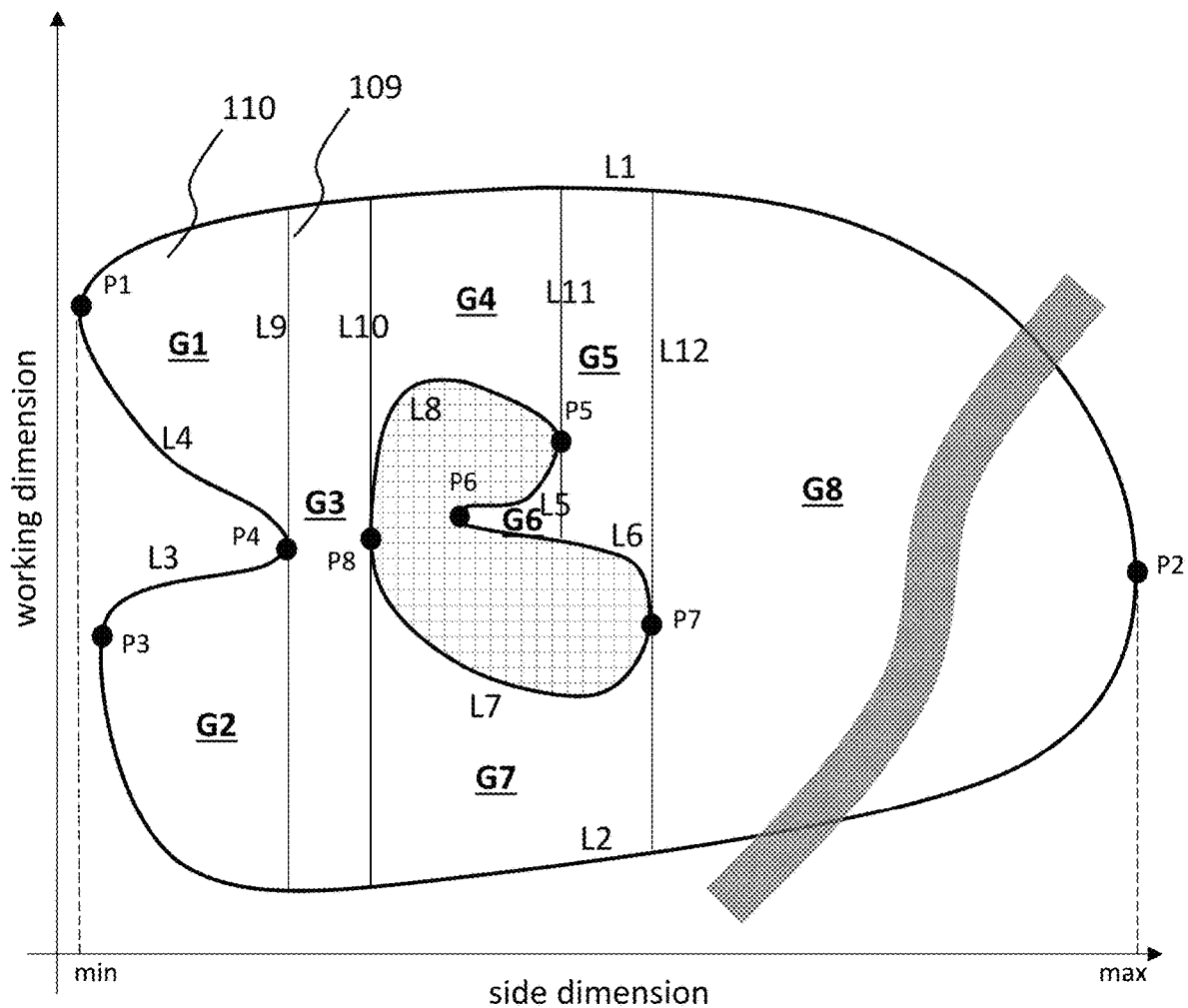
FIG. 1D illustrates partitioning of the operation area.

The tangential points divide the edges into a number fragments (e.g., L1-L8 in FIG. 1C). Further, straight lines along the working dimension are drawn that pass through the tangential points (e.g., lines L9-L12 thorough P4, P8, P5 and P7, respectively, in FIG. 1D) Between the fragments L1-L8 and lines L9-L12, eight divisions of the surface are formed. Each division includes one or more flight sections and forms a section group. As illustrated in FIG. 1D, these section groups are G1-G8.

Figure 1E:
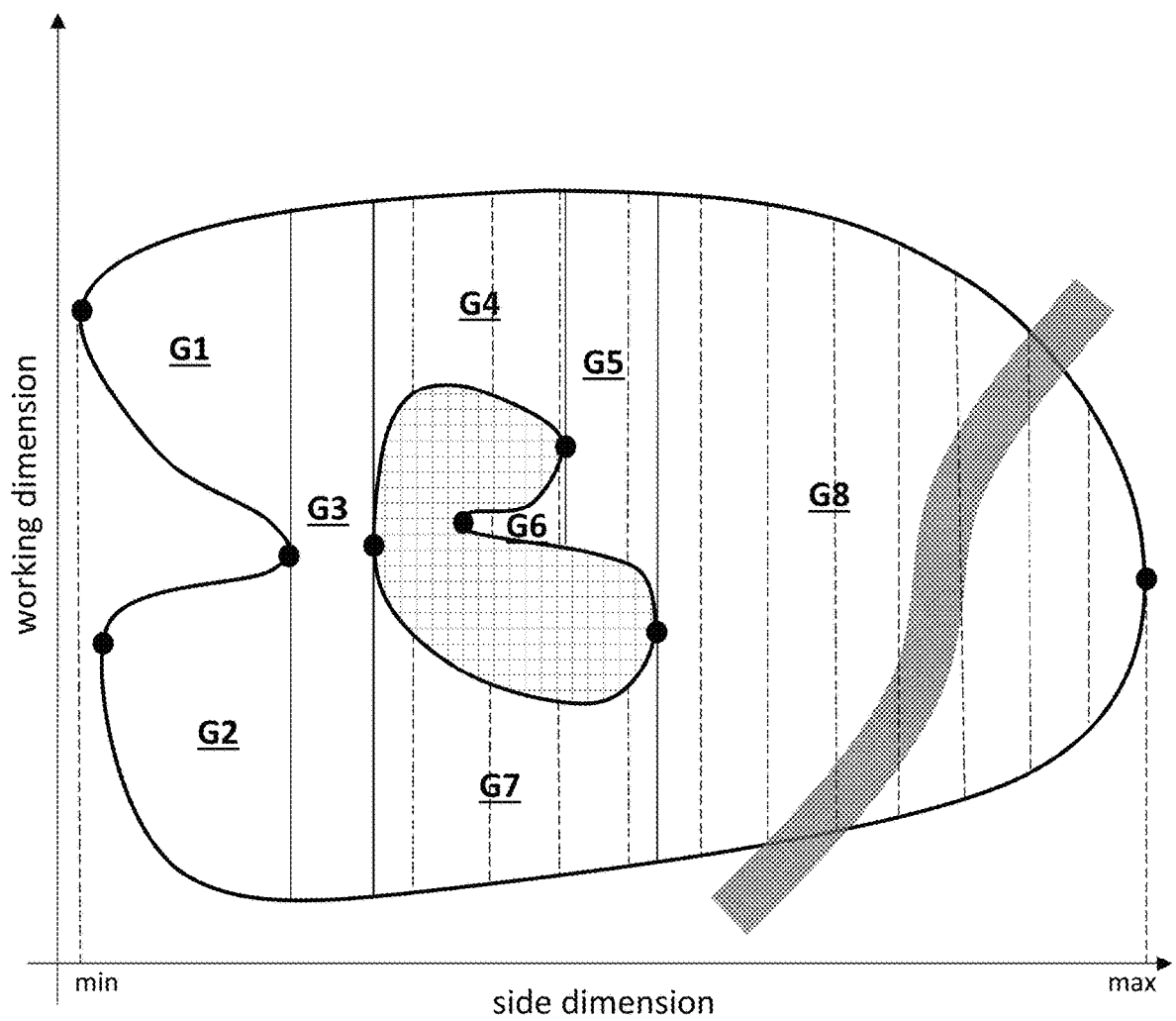
FIG. 1E shows that flight sections are grouped according to the partitioned operation area.

In accordance with various embodiments, the system can identify an overall flight path that connects the different section groups to minimize non-operational flight (see FIG. 1E).

Figure 1F:
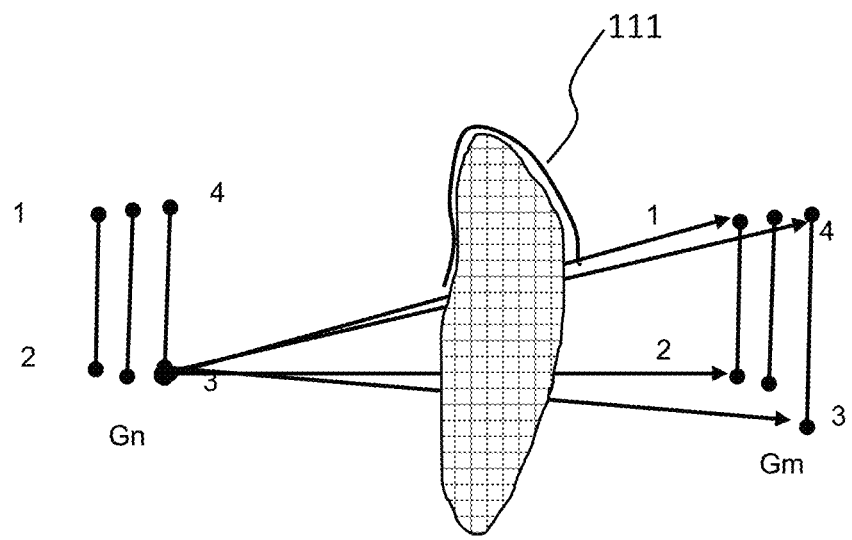
FIG. 1F illustrates a method of connecting two flight section groups to avoid an obstacle between them.

Consider a simplified version of this problem as illustrated in FIG. 1F. Section group n (Gn) includes flight sections such as [1 2] and [3 4]. Section group m (Gm) includes flight sections such as [1 2] and [3 4]. A matrix (ajMat) can be set up to account for the distance of each non-operational flight between the flight sections in Gn and those in Gm. For instance, path 111 represents the non-operational flight from intersection point 3 in Gn to intersection point 1 in Gm.

Figure 1G:
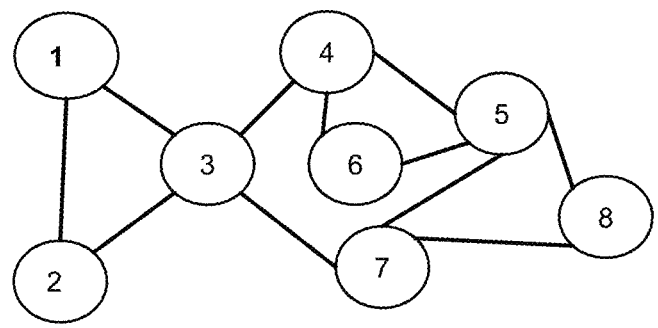
FIG. 1G illustrates the construction of an overall flight path by connecting different flight section groups.

With the matrices set up for each pair of section groups, an overall flight path that connects the groups can be identified. Also, when considering the pairs of section groups, the relative locations of the groups can be used to simply calculation, as illustrated in FIG. 1G.

Once a flight path is planned on a two-dimensional space, it may be converted to a three-dimensional flight path. The conversion may be the inverse of the conversion of the three-dimensional surface to a two-dimensional representation. Accordingly, upon the conversion, the flight path will still have a substantially constant altitude over the surface.

Figure 1H:
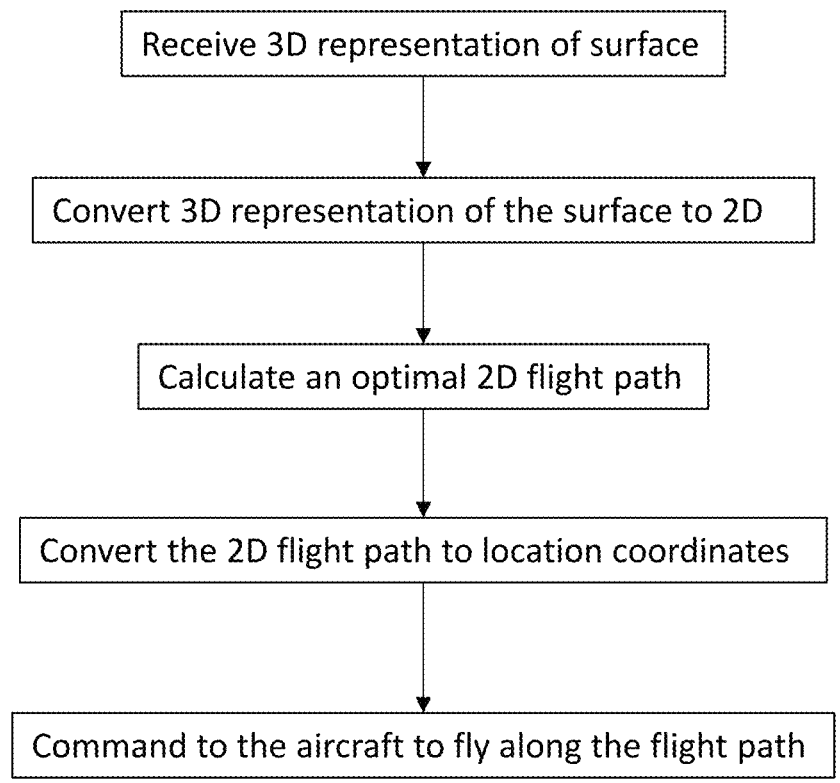
FIG. 1H is an example flow chart illustrating the planning and use of a flight.
Figure 1I:
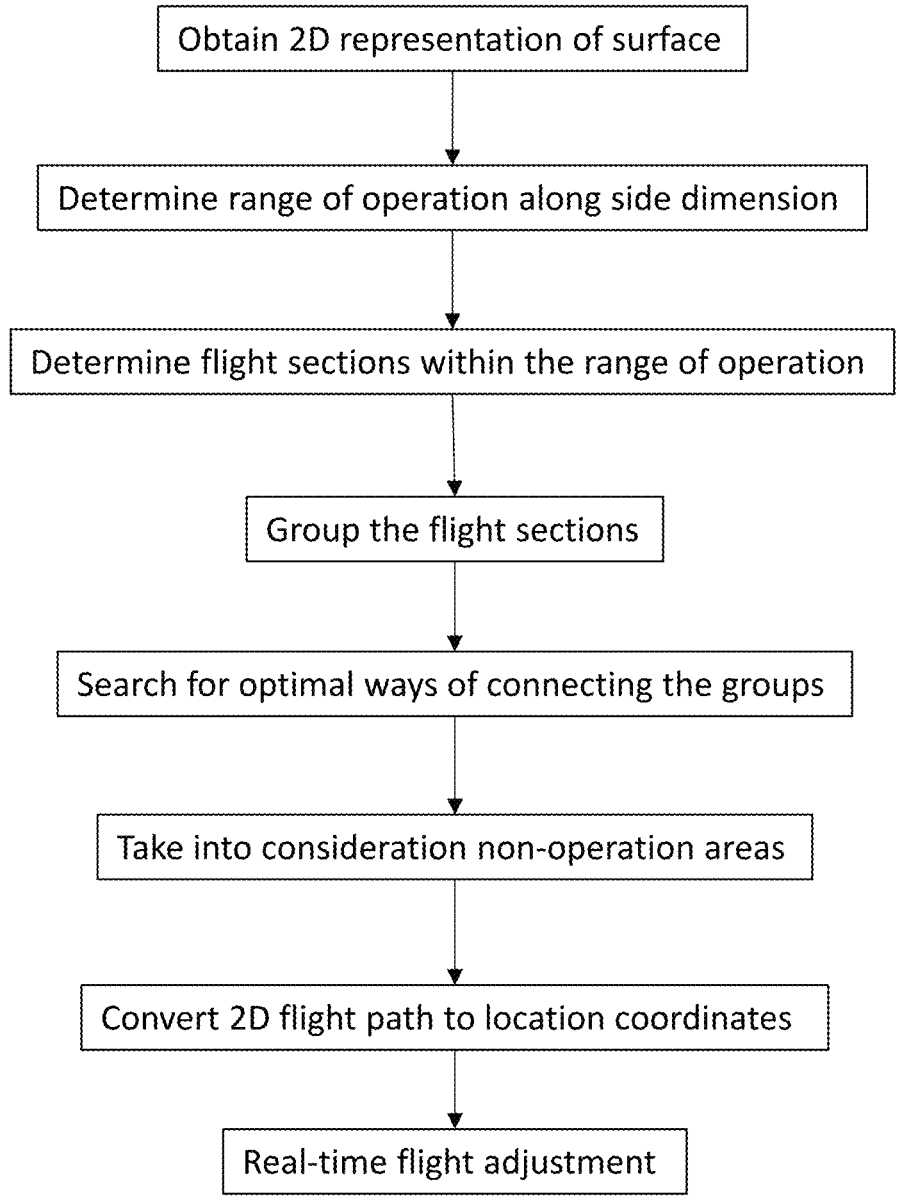
FIG. 1I is an example flow chart for planning a flight and read-time adjusting the flight.

One embodiment of the overall process of planning a flight path and using the flight path to direct the flight of an aircraft is illustrated in FIG. 1H. At a first step, a three-dimensional representation of a surface is obtained, which is then converted to two-dimensional. The two-dimensional representation of the surface is used to identify an optimal flight path, which is then used to direct the flight of an aircraft. FIG. 1I illustrates, in more details, a method of identifying a flight path and adjusting the flight path real-time.

Depending on the size of the surface and the operation to carry out, an aircraft may not be able to complete the entire flight path without refilling or replacing the power supply. Therefore, in some instances, it is helpful to consider the need to refill or replace the power supply when planning the flight path. Alternatively, the flight path can be adjusted on the fly depending on the status of the remaining power supply at the aircraft. For the purpose of this disclosure, power supply refilling and power supply replacement are generally referred to as "power refilling" or simply "refilling".

Figure 3A:
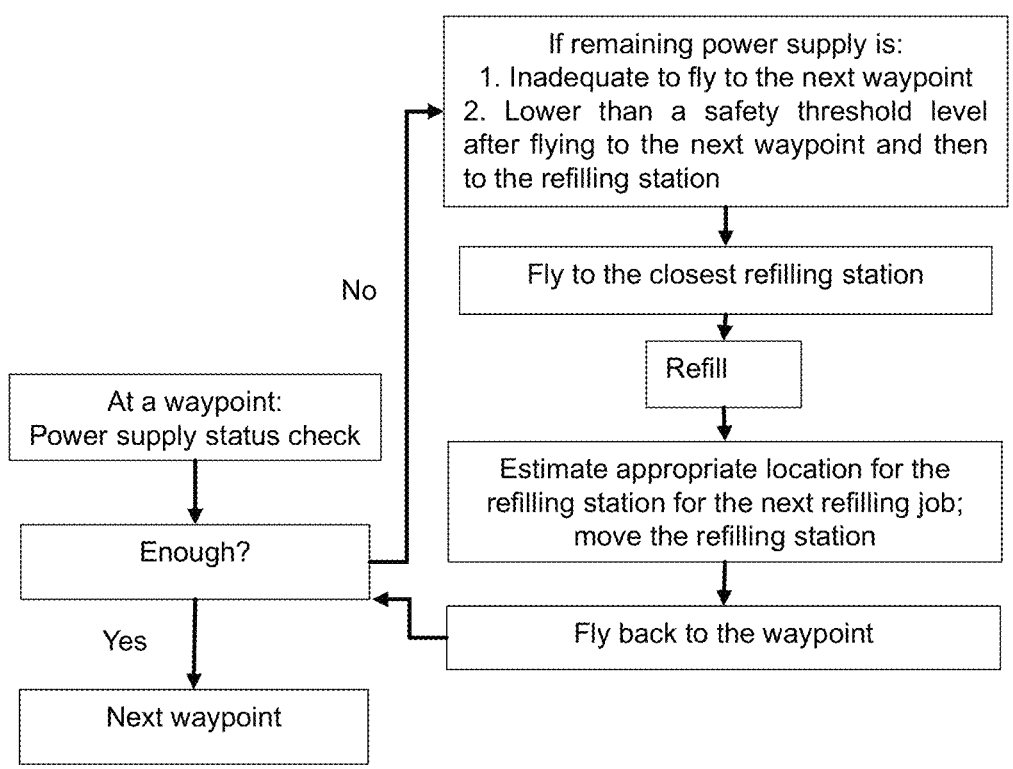
FIG. 3A illustrates a method of determining whether power supply refilling or replacement at a waypoint.

FIG. 3A illustrates a process for determining when and where to refill the power supply. Certain information may be needed in advance, such as a maximum distance (maxFlightDistance) the aircraft can fly after refilling, a location or a collection of locations where a refilling station can be found or moved to ("station path"), a maximum distance the refilling station can move before the power supply of the aircraft is exhausted (maxGroundWalk), and a safety threshold level (safePowerPercent) that is required for the aircraft to retain before being refilled. Not all of these parameters are required in advance, it is important to note, and further the parameters may be adjusted at any time.

A flight path may include multiple waypoints to facilitate the determination of refilling time and location. The starting point of the flight path may be a waypoint. Each intersection point can also be a waypoint. Taking into consideration of the maxFlightDistance, additional waypoints may be designated along the flight path such that the distance between each neighboring waypoints is a portion (e.g., about one half, one third, one fourth, one fifth, or one sixth) of the maxFlightDistance.

At each waypoint, the status of the power supply may be checked for determination of whether the flight may be continued at the flight path. The remaining power supply is not "enough" when it is lower than what is required to complete a flight to the next waypoint, then to a refilling station closest to the next waypoint, and still maintain the safety threshold level. When the remaining power supply it not enough, the flight along the flight path is paused and the aircraft flies to a refilling station, such as one that is closest to the current waypoint. While the aircraft flies to the refilling station, the refilling station can optionally move closer to the aircraft to shorten the time needed for the refilling.

Once refilling is completed, the aircraft flies back to the waypoint, and continues on along the flight path to the next waypoint, where the status of the power supply may be checked again.

Upon completion of the refilling, an estimate may be made as to the possible waypoint from which the aircraft will need to depart to seek the next refilling. Accordingly, the refilling station may be moved in that direction to minimize the distance required for the aircraft to receive refilling. Given such movement, it may be helpful to update the location of the refilling station when determining whether a refilling is required for the aircraft at a next waypoint.

Figure 3B:
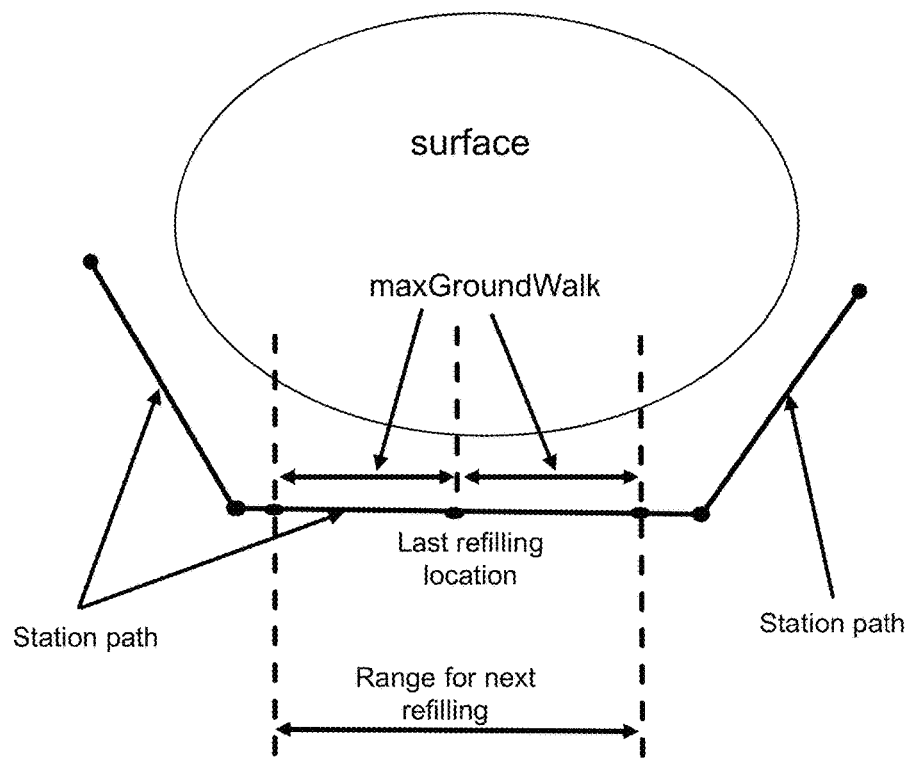
FIG. 3B provides a schematic illustration of a surface with paths to move a refilling station to support the flight.

As illustrated in FIG. 3B, the aircraft is carrying out an operation above the surface, and the station path beside the surface is designated for moving the refilling station. Upon completion of a refilling task, the refilling station can move left or right, depending on the flight path. The range of such movement is beneficial to the decision process illustrated in FIG. 3A.

It is noted that the maxFlightDistance may be difficult to estimate and may be subject to change or variation. One reason is that the refilling/recharging may not be complete every time. Likewise, a replaced battery may not be as fully charged or retain the full potential after some use. Also, the environmental factor such as wind and temperature as well as the physical property of the aircraft can also impact the flight distance. For instance, if the aircraft carries a pesticide to be sprayed, a full container of pesticide will consume more power than a half-empty one. Accordingly, it may be beneficial to factor in an error rate when using the maxFlightDistance. In one instance, the error rate may be a fraction of the maxFlightDistance, such as 5%, 10%, 15%, 20%, 25% or 30%. Consideration of the error rate will ensure that the aircraft does not fail to reach a refilling station unexpectedly.

In some instances, the aircraft may carry an amount of a dispensable substance for dispensing over the surface. A "dispensable substance" as used herein refers to a solid, liquid, gaseous material or the mixture thereof, that is suitable for distributing or dispensing over a surface. In some embodiments, when the dispensable substance is a solid, it can be in the shape of particles regardless of shape. The dispensable substance may be a pesticide, a seed, a nutrient, or a chemical fire extinguisher, without limitation. Sometimes, the dispensable substance also needs refilling. Refilling of the dispensable substance may take advantage of the power supply refilling. That is, the aircraft may only carry enough dispensable substance for dispensing within the maxFlightDistance. As such, the weight of the aircraft is minimized, and each time when the power supply is refilled, the dispensable substance can also be refilled.

Changing the flight path temporarily so that the aircraft can have power supply refilling is one example of real-time adjustment, even though that such refilling trips can be predetermined as well. Other needs for real-time adjustment also exist. For example, the predetermined flight path may not have accounted for environmental factors such as wind, temperature, humidity, or air pressure. Also, there may be obstacles that were not present, were not observed, or otherwise not considered when planning the flight.

To enable real-time adjustment based on a change of environmental factor, information about the environmental factor needs to be obtained. One example is to receive such information from a remote source, such as a weather forecasting or reporting service. In another example, the information can be fed from a device that is placed close to the surface or where the aircraft flies. In yet another example, the information is obtained directly from the aircraft itself, which includes a suitable sensor.

If the change of the environmental factor is a change of wind direction or speed, the flight path may be adjusted so that the operation can be carried out as planned. For instance, for spraying a pesticide on the surface, within the flight section, the flight path may be adjusted against the direction of the wind so that the spray will cover the flight section. On the other hand, the flight path may be adjusted along the direction of the wind so that the power consumption can be minimized. Likewise, adjustments can be made to accommodate changes of temperature, humidity or air pressure.

Another factor that may be overlooked during flight planning is an unexpected obstacle. The unexpected obstacle may be newly present and thus was not present in the representation of the surface, or is too small to be detected by a survey mechanism that generated the representation of the surface, but nevertheless is large enough to block the flight or damage the aircraft if not avoided. An example of such an unexpected obstacle is illustrated as a tree in FIG. 4.

If the unexpected obstacle is present on the flight path, a mechanism is needed to detect the obstacle and the fight path needs adjusting to avoid the obstacle. In one non-limiting example, the aircraft is equipped with a sensor that is sensitive enough to detect the obstacle including, for instance, the branches or leaves of the tree in FIG. 4.

Another factor that may result in adjustment of the flight path is the actual location of the surface. For instance, on a ground there are trees or crops for the purpose of spraying a pesticide, seed or nutrients, the surface comprises the top tips of the crops or the trees. Either because the crops or the trees have grown after a survey was done, or the survey was not accurate, it may be helpful to conduct real-time survey of the surface to ensure that the operation is conducted properly.

Figure 4:
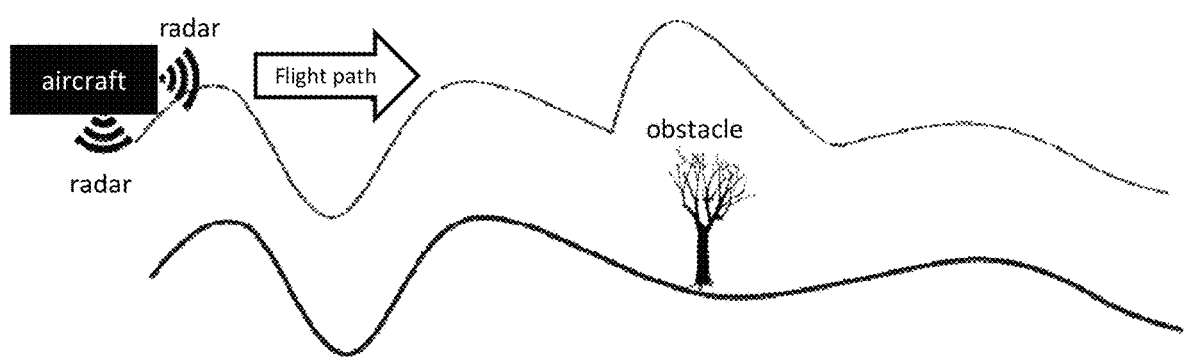
FIG. 4 illustrates the detection and avoidance of an obstacle along a flight path.

The sensor that may be included in (or attached to) the aircraft may be a radar unit. The radar unit may include a radar signal transmitter and a radar signal detector. As illustrated in FIG. 4, the aircraft contains a radar unit which transmits signal towards the surface, which appears uneven, and forward along the flight path. If the surface is different from what is used in generating the flight path, adjustment may be done to ensure that the flight path has a substantially constant altitude over the surface.

Along the flight path, when the radar unit detects an obstacle, the flight path can also be adjusted. Depending on the size and shape of the obstacle, the adjustment may be done to minimize the detour. For instance, if the obstacle is relatively short, the adjusted flight path goes over the obstacle. Otherwise, the adjusted flight path goes left or right around the obstacle.

As illustrated above, in some instances, the aircraft does not carry out an operation alone and the movement of power refilling stations can be coordinated with the movement of the aircraft to minimize non-operational flight. Other types of coordination, such as ground-air, air-air, ground-ground-air or ground-air-air coordination may also be beneficial.

In one example, when planning a flight path, the path may be partitioned into multiple portions such that each portion is covered by a different aircraft. In one implementation, each portion has similar overall distance so that if the aircrafts start at a similar time, they may complete the operation at similar times. In another implementation, each portion has similar overall distance but the aircrafts start the operations at different times so that they do not simultaneously need refilling assuming the number of refilling stations is limited or sharing of refilling stations is desired.

The coordination between aircrafts may also be that some of the aircrafts carry out a different function from others. For instance, one aircraft is equipped with one or more sensors to detect the environmental conditions (wind, temperature etc) useful for adjusting the flight path for all aircrafts. In this example, the other aircrafts are not required to include or use the sensors.

In some instances, a system of multiple aircrafts optionally with a central server is coordinated. The central server may be located on the ground (or on a similar non-flying object). The different aircrafts or server can undertake one or more of the following activities: (1) pre-flight survey, (2) flight planning, (3) flight or environmental monitoring, or (4) operation parameter configuration. To facilitate the coordination, the status of each aircraft and operational parameters are communicated within the system.

One or more aircraft assigned to undertake this task may fly over the designated surface and collect coordinates of representative locations, Each location is numbered and then categorized, which may be for instance (a) boundary of an operation area, (b) boundary of a non-operation area, (c) boundary of an obstacle area or (d) service station (e.g., power refilling station or supply refilling station). Within an obstacle area, data collection is not needed. Within a non-operation area, data collection can be accordingly reduced.

In addition to the flight planning as described earlier, the flight planning for a coordinated operation may include additional information and consideration.

For any embodiment of the present disclosure, the properties of an aircraft may need to be considered for flight planning or coordination. Such properties include, for example, coverage width, maximum flight distance, and maximum flight speed. For aircrafts that carry a dispensable substance for dispensing, the properties may also include maximum capacity for the dispensable substance or maximum dispensing rate. With these properties, the system can then design flight paths for all the aircrafts to achieve high efficiency, good parallel operation, and speedy completion. The flight paths referred here may also include flight taken for refilling.

With the information provided from the survey, the system can calculate the total size of the surface, and the size of the operation areas, non-operation areas or obstacle areas. With the planed flight path for the aircrafts, a total time can also be derived assuming each aircraft commences the operation at the same time. The total time may also include the time to fly from a start location to the surface, flight time over the surface, and time to reach a refilling station and refill.

Based on the total size of the surface and the total time needed, the system can also determine an optimal arrangement for each aircraft. Once such planning is completed, a user only needs to place the aircraft at a designated start location, and the operation will ensure as planned.

The flight status of each aircraft or the environmental conditions at the operation site may be monitored to ensure efficiency and correctness of the operation. Each aircraft may transit its own status, e.g., altitude, GPS coordinates, encounter of obstacle, remaining power supply, signal strength, to another aircraft or a central server. One or more aircrafts that are assigned to monitor environmental conditions may transmit information about the environmental conditions to the server as well. All of part of such information is processed, and if needed, command or information can be transmitted to one or more of the aircraft to adjust or alter the activity of the aircraft.

Figure 5:
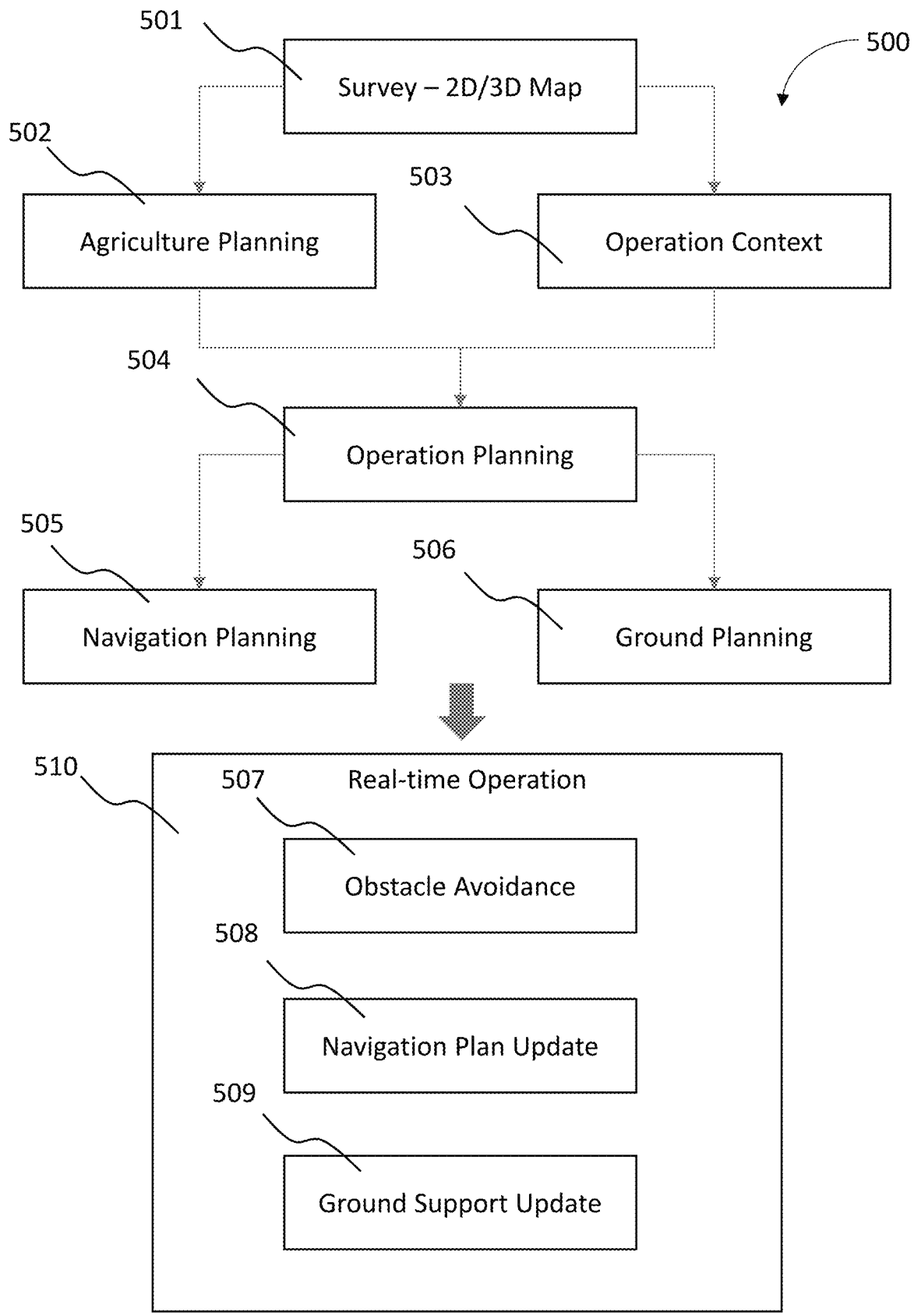
FIG. 5 shows an example flow chart for flight planning and coordination.

Some of the embodiments of the above disclosure are illustrated in the flow chart 500 of FIG. 5. It is worth noting that each of the steps in 500 may be independently carried out or left out from the overall process. At step 501, a survey may be conducted that obtains a map of the surface over which a flight path is planned. This map may be two-dimensional or three-dimensional, each of which may be directly used for flight planning. Optionally, a three-dimensional map may be converted to two-dimensional to reduce the amount of computation needed.

The map of the surface may be used for flight planning, such as agriculture planning (step 502). Agricultural use of an aircraft, such an UAV, may include crop field survey or monitoring, or pesticide, seed or nutrient spray, without limitation, which can be liquid, powdered or particles. The flight planning may include identification or design of a flight path over the surface, which flight path may then be used for operation planning (504). Operation planning generally refers to preparation and carrying out an operation over the surface. Optionally, it may be helpful to consider the operation context (e.g., environmental conditions) of the surface (step 503) when planning for the operation.

An operation may include a flight along the planned flight path, for which navigation is needed (step 505). The navigation may be empowered by description or coordinates of the flight path, which may be fed to the aircraft to guide navigation. Alternatively, the aircraft may receive direct command on flying, rather than coordinates, from a remote device.

Depending on whether more than one aircrafts are used in an operation, coordination between aircrafts may be needed. Among multiple aircrafts, the operation may be carried in parallel and their tasks may be the same. Alternatively, some of the aircrafts may undertake tasks (e.g., environmental condition monitoring) that are different those of the others.

Ground planning (506) may also be needed. Ground support may be needed for refilling or replacing the power supply for the aircraft, refilling or replacing the material supply (e.g., pesticide) carried by the aircraft, or monitoring and communication for the operation.

In some instances, real-time operation may be needed. See, in general, block 510. Non-limiting examples of real-time operations include detecting and avoiding obstacles (507), providing or updating navigation plans (508, e.g., flight plans), providing or updating ground support (509). Example embodiments for each of these elements are described in more detail above.

The presently disclosed technology may be implemented with various types of aircrafts, such as unmanned aerial vehicles (UAV). The UAV may include a propulsion system having a number of rotors. Any number of rotors may be provided (e.g., one, two, three, four, five, six, or more). The rotors, rotor assemblies, or other propulsion systems of the UAV may enable the UAV to hover and maintain position, change orientation, and change location.

The aircraft may be configured to carry a dispensable substance (e.g., pesticide, seed, nutrient). The dispensable substance can include one or more of passengers, cargo, equipment, instruments, and the like. The dispensable substance can be provided within a housing. The housing may be separate from a housing of the aircraft, or be part of a housing for an aircraft. Alternatively, the dispensable substance can be provided with a housing while the aircraft does not have a housing. Alternatively, portions of the dispensable substance or the entire dispensable substance can be provided without a housing. The dispensable substance can be rigidly fixed relative to the aircraft. Optionally, the dispensable substance can be movable relative to the aircraft (e.g., translatable or rotatable relative to the aircraft).

For certain embodiments of the present disclosure, the aircraft is also equipped with one or more payloads. A payload can include one or more sensors, examples of which include a temperature sensor to monitoring air temperature, an airflow sensor to measure wind speed and direction, and an optical sensor for detecting an object. Optionally, the aircraft may be equipped with a radar unit, which may include a radar transmitter and a radar signal detector.

The actions of the aircraft including the dispensing of its dispensable substance where applicable may be controlled by a terminal. The terminal can be a remote control device at a location distant from the aircraft, carrier, payload, and/or dispensable substance. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the aircraft, carrier, payload, and/or dispensable substance. For example, the terminal can be used to control the position and/or orientation of the aircraft, carrier, payload, and/or dispensable substance relative to a fixed reference from and/or to each other. In some embodiments, the terminal can be used to control individual elements of the aircraft, carrier, payload, and/or dispensable substance, such as the actuation assembly of the carrier, a sensor of the payload, or an emitter of the dispensable substance. The terminal can include a wireless communication device adapted to communicate with one or more of the aircraft, carrier, payload, and/or dispensable substance.

The terminal can include a suitable display unit for viewing information of the aircraft, carrier, payload and/or dispensable substance. For example, the terminal can be configured to display information of the aircraft, carrier, payload and/or dispensable substance with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may control the aircraft, carrier, payload, and/or dispensable substance, or a state of the aircraft, carrier, payload, and/or dispensable substance, as well as receive and/or display information from the aircraft, carrier, payload, and/or dispensable substance. For example, a terminal may control the positioning of the payload relative to an environment, while displaying image data captured by the payload, or information about the position of the payload. Alternatively, different terminals may be used for different functions. For example, a first terminal may control movement or a state of the aircraft, carrier, payload and/or dispensable substance while a second terminal may receive and/or display information from the aircraft, carrier, payload and/or dispensable substance. For example, a first terminal may be used to control the positioning of the payload relative to an environment while a second terminal displays image data captured by the payload. Various communication modes may be utilized between an aircraft and an integrated terminal that both controls the aircraft and receives data, or between the aircraft and multiple terminals that both control the aircraft and receives data. For example, at least two different communication modes may be formed between the aircraft and the terminal that both controls the aircraft and receives data from the aircraft.

Figure 6:
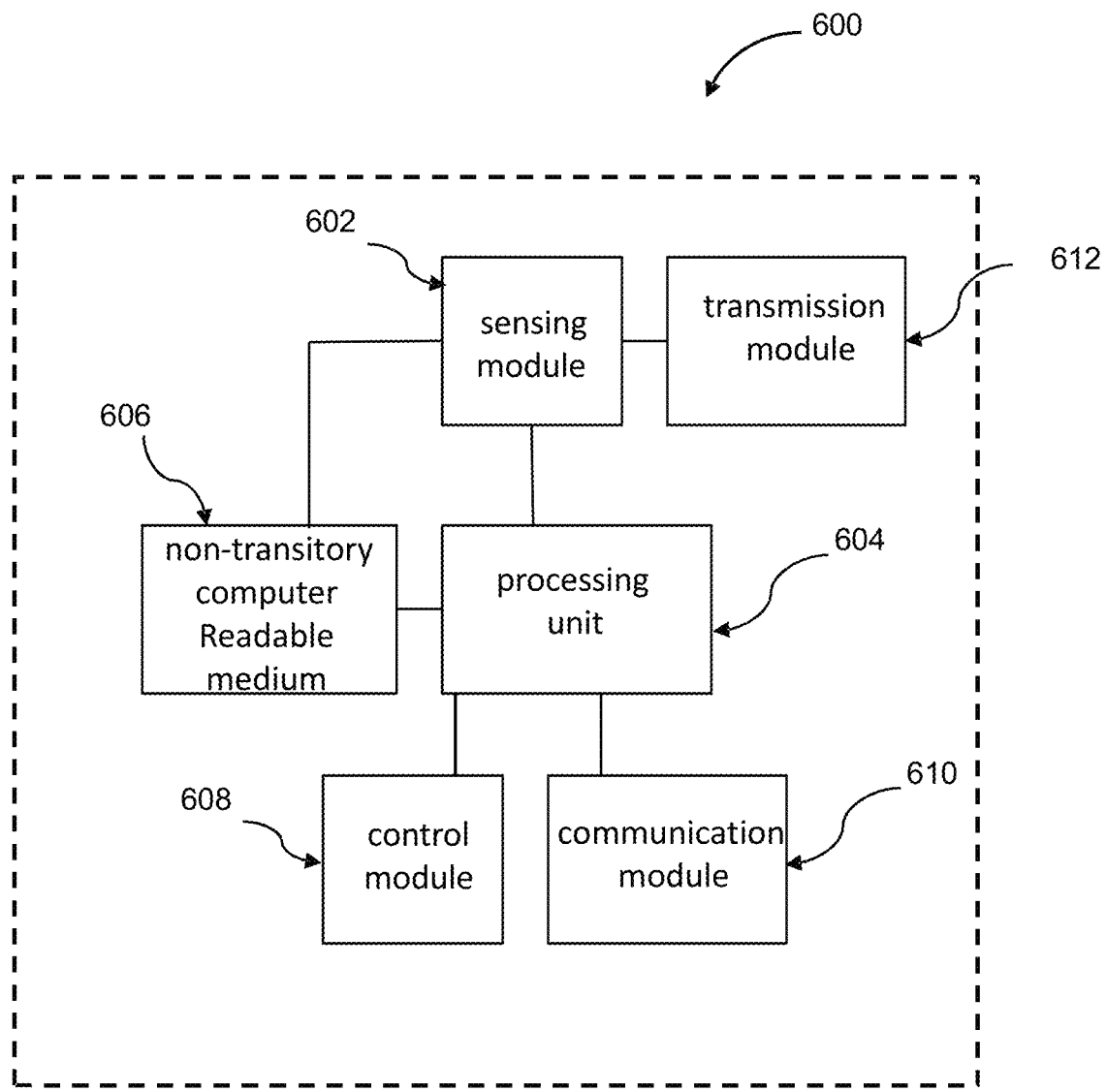
FIG. 6 is a schematic illustration by way of block diagram of a system for controlling a movable object, in accordance with an embodiment of the disclosure.

FIG. 6 is a schematic illustration by way of block diagram of a system 600 for controlling an aircraft, in accordance with some embodiments. The system 600 can be used in combination with any suitable embodiment of the systems, devices, and methods disclosed herein. The system 600 can include a sensing module 602, processing unit 604, non-transitory computer readable medium 606, control module 608, and communication module 610.

The sensing module 602 can utilize different types of sensors that collect information relating to the aircrafts in different ways. Different types of sensors may sense different types of signals or signals from different sources. For example, the sensors can include inertial sensors, GPS sensors, proximity sensors (e.g., lidar), a radar u nit, or vision/image sensors (e.g., a camera). The sensing module 602 can be operatively coupled to a processing unit 604 having a plurality of processors. In some embodiments, the sensing module can be operatively coupled to a transmission module 612 (e.g., a Wi-Fi image transmission module) configured to directly transmit sensing data to a suitable external device or system. For example, the transmission module 612 can be used to transmit images captured by a camera of the sensing module 602 to a remote terminal.

The processing unit 604 can have one or more processors, such as a programmable processor (e.g., a central processing unit (CPU)). The processing unit 604 can be operatively coupled to a non-transitory computer readable medium 606. The non-transitory computer readable medium 606 can store logic, code, and/or instructions executable by the processing unit 604 for performing one or more steps. The non-transitory computer readable medium can include one or more memory units (e.g., removable media or external storage such as an SD card or random access memory (RAM)). In some embodiments, data from the sensing module 602 can be directly conveyed to and stored within the memory units of the non-transitory computer readable medium 606. The memory units of the non-transitory computer readable medium 606 can store logic, code and/or instructions executable by the processing unit 604 to perform any suitable embodiment of the methods described herein. For example, the processing unit 604 can be configured to execute instructions causing one or more processors of the processing unit 604 to analyze sensing data produced by the sensing module. The memory units can store sensing data from the sensing module to be processed by the processing unit 604. In some embodiments, the memory units of the non-transitory computer readable medium 606 can be used to store the processing results produced by the processing unit 604.

In some embodiments, the processing unit 604 can be operatively coupled to a control module 608 configured to control a state of the aircraft. For example, the control module 608 can be configured to control the propulsion mechanisms of the aircraft to adjust the spatial disposition, velocity, and/or acceleration of the aircraft with respect to six degrees of freedom. Alternatively or in combination, the control module 608 can control one or more of a state of a carrier, payload, or sensing module.

The processing unit 604 can be operatively coupled to a communication module 610 configured to transmit and/or receive data from one or more external devices (e.g., a terminal, display device, or other remote controller). Any suitable means of communication can be used, such as wired communication or wireless communication. For example, the communication module 610 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 610 can transmit and/or receive one or more of sensing data from the sensing module 602, processing results produced by the processing unit 604, predetermined control data, user commands from a terminal or remote controller, and the like.

The components of the system 600 can be arranged in any suitable configuration. For example, one or more of the components of the system 600 can be located on the aircraft, carrier, payload, terminal, sensing system, or an additional external device in communication with one or more of the above. Additionally, although FIG. 6 depicts a single processing unit 604 and a single non-transitory computer readable medium 606, one of skill in the art would appreciate that this is not intended to be limiting, and that the system 600 can include a plurality of processing units and/or non-transitory computer readable media. In some embodiments, one or more of the plurality of processing units and/or non-transitory computer readable media can be situated at different locations, such as on the aircraft, carrier, payload, terminal, sensing module, additional external device in communication with one or more of the above, or suitable combinations thereof, such that any suitable aspect of the processing and/or memory functions performed by the system can occur at one or more of the aforementioned locations.

Figure 7:
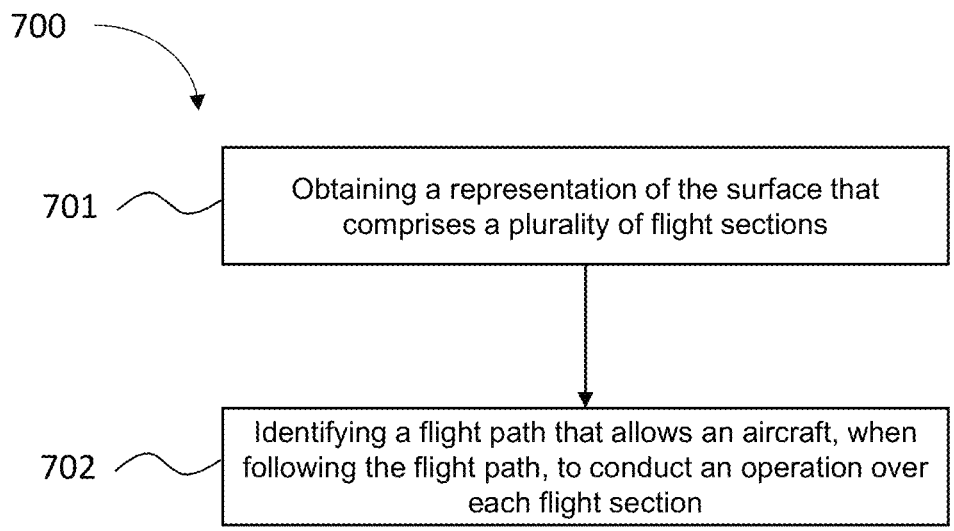
FIG. 7 shows a flowchart of supporting aerial operation over a surface, in accordance with an embodiment of the disclosure.

FIG. 7 shows a flowchart 700 illustrating a method of supporting aerial operation over a surface, in accordance with various embodiments of the present disclosure. At step 701, a representation of the surface that comprises a plurality of flight sections can be obtained. At step 702, a flight path can be identified that allows an aircraft, when following the flight path, to conduct an operation over each flight section.

In some embodiments, the operation comprises dispensing a dispensable substance or conducting a survey over the flight sections. In some embodiments, at least two of the flight sections share a border with each other. In some embodiments, the surface comprises at least an operation area, the flight sections within which allow the aircraft to fly over to conduct the operation. In some embodiments, the surface further comprises at least an obstacle area that the aircraft can avoid. In some embodiments, the flight sections are separated into flight section groups with (a) one or more edges of the operation area, (b) one or more edges of the obstacle area, and (c) one or more lines that are tangential to any of the edges of (a) and (b). In some embodiments, identification of the flight path comprises determination of paths that connect the flight section groups. In some embodiments, the method further comprises instructing an aircraft to fly along the flight path.

In some embodiments, the representation of the surface is three-dimensional. In some embodiments, the representation comprises global positioning system (GPS) coordinates. In some embodiments, the method further comprises converting the three-dimensional representation to a two-dimensional representation. In some embodiments, the method further comprises converting the flight path identified from the two-dimensional surface to three-dimensional.

In some embodiments, identification of the flight path comprises consideration of an environmental factor. In some embodiments, the environmental factor comprises one or more selected from the group consisting of wind, temperature, humidity, and pressure.

In some embodiments, each flight section has a substantially identical coverage width. In some embodiments, the method further comprises calculating the coverage width. In some embodiments, the calculation takes as input the altitude of a flight, type of the aircraft or type of the dispensable substance. In some embodiments, the coverage width is smaller than an operation width that the aircraft can conduct the operation on. In some embodiments, the coverage width is 1% to 20% smaller than the operation.

In some embodiments, at least one of the flight sections overlaps with an adjacent flight section. In some embodiments, the overlapping constitutes about 1% to about 20% of the width of the adjacent flight section.

In some embodiments, the operation comprises dispensing a dispensable substance, and wherein the dispensable substance is selected from the group consisting of is a nutrient, a seed, a pesticide and a chemical fire extinguisher. In some embodiments, the method further comprises receiving a location of power supply station, wherein the flight path goes through the location of the power supply station. In some embodiments, the location comprises a track on which the power supply station is allowed to move.

In some embodiments, the flight path has a substantially constant altitude relative to the surface. In some embodiments, the surface further comprises one or more non-operation areas over which flight is allowed but operation is not required.

Figure 8:
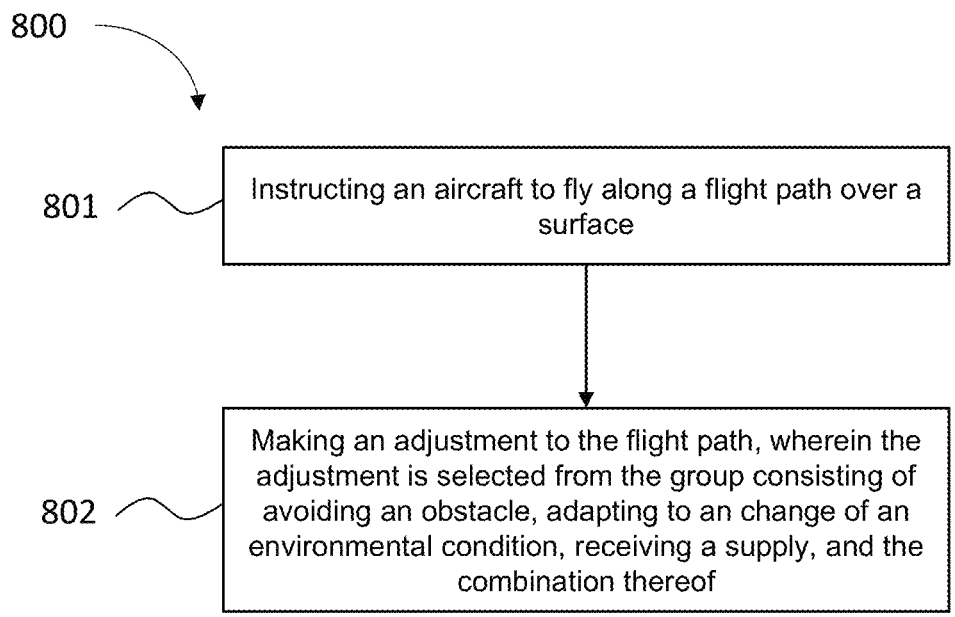
FIG. 8 shows a flowchart of supporting aerial operation, in accordance with an embodiment of the disclosure.

FIG. 8 shows a flow chart 800 illustrating a method for supporting aerial operation. At step 801, an aircraft can be instructed to fly along a flight path over a surface. At step 802, an adjustment can be made to the flight path, wherein the adjustment is selected from the group consisting of avoiding an obstacle, adapting to a change of an environmental condition, receiving a supply, and the combination thereof.

In some embodiments, the method further comprises detecting the change of the environmental condition. In some embodiments, the change of the environmental condition comprises a change of wind direction, wind speed, humidity, or air pressure. In some embodiments, the method comprises detecting the obstacle. In some embodiments, the method further comprises monitoring the altitude of the aircraft over the surface.

In some embodiments, the surface is uneven. In some embodiments, the supply is a dispensable substance that the aircraft dispenses over the surface. In some embodiments, the dispensable substance comprises a pesticide, a seed, a nutrient or a chemical fire extinguisher. In some embodiments, the flight path is adjusted for the aircraft to arrive at a dispensable substance refilling station.

In some embodiments, the supply is power supply. In some embodiments, the method further comprises determining a point of the flight path from which the aircraft depart to fly to a power supply refilling station.

In some embodiments, determination of the point comprises obtaining a plurality of waypoints along the flight path; determining, at a first waypoint of the plurality of waypoints, whether the aircraft has a power supply level that is sufficient for the aircraft to fly to the subsequent waypoint along the flight path and to fly to a power supply refilling station; and flying the aircraft to a power supply refilling station if the power supply level is determined to be not sufficient.

In some embodiments, the method further comprises flying the aircraft back to the first waypoint. In some embodiments, the method further comprises moving the power supply refilling station to a direction closer to a subsequent location on the flight path where the aircraft is estimated to depart to receive refilling. In some embodiments, the method further comprises obtaining the updated location of the power supply refilling station.

In some embodiments, the surface comprises one or more non-operation areas over which the aircraft is allowed to fly but does not need to conduct an operation. In some embodiments, the method further comprises instructing two or more aircrafts to each fly a portion of the flight path. In some embodiments, the portions are identified such that each aircraft completes the flight at approximately the same time if the aircraft starts the flight at the same time. In some embodiments, the identification takes into consideration one or more properties of each aircraft. In some embodiments, the properties comprise coverage width, maximum flight distance, or maximum flight speed of the aircrafts. In some embodiments, at least one of the aircrafts is equipped with a sensor for detecting the change of an environmental condition.

In some embodiments, the method further comprises instructing the at least one aircraft to detect the change of an environmental condition. In some embodiments, the change of the environmental condition comprises a change of wind direction, wind speed, humidity, or air pressure.

Systems, apparatuses, non-transitory computer-readable media are also provided that support or implement various methods and techniques of the present disclosure. For instance, one embodiment provides a system for supporting aerial operation over a surface, comprising a processor and instructions which, when executed by the processor, operate to: obtain a representation of the surface that comprises a plurality of flight sections; and identify a flight path that allows an aircraft, when following the flight path, to conduct an operation over each flight section.

Another embodiment provides a system for supporting aerial operation, comprising a processor and instructions which, when executed by the processor, operate to: instruct an aircraft to fly along a flight path over a surface; and make an adjustment to the flight path, wherein the adjustment is selected from the group consisting of avoiding an obstacle, adapting to a change of an environmental condition, receiving a supply, and the combination thereof.

Another embodiment provides non-transitory computer-readable medium for supporting aerial operation over a surface, comprising instructions stored therein, wherein the instructions, when executed by a processor, perform the steps of obtaining a representation of the surface that comprises a plurality of flight sections; and identifying a flight path that allows an aircraft, when following the flight path, to conduct an operation over each flight section.

Another embodiment provides a non-transitory computer-readable medium for supporting aerial operation, comprising instructions stored therein, wherein the instructions, when executed by a processor, performs the steps of instructing an aircraft to fly along a flight path over a surface; and making an adjustment to the flight path, wherein the adjustment is selected from the group consisting of avoiding an obstacle, adapting to a change of an environmental condition, receiving a supply, and the combination thereof.

Another embodiment provides a system for supporting aerial operation over a surface, comprising a processor; a first module configured to obtain a representation of the surface that comprises a plurality of flight sections; and a second module configured to identify, by a processor suitably programmed, a flight path that allows an aircraft, when following the flight path, to conduct an operation over each flight section.

Another embodiment provides a system for supporting aerial operation, comprising: a processor, a first module configured to instruct an aircraft to fly along a flight path over a surface, and a second module configured to make an adjustment to the flight path, wherein the adjustment is selected from the group consisting of avoiding an obstacle, adapting to a change of an environmental condition, receiving a supply, and the combination thereof.

Another embodiment provides a system for supporting aerial operation over a surface, comprising a processor, means for obtaining a representation of the surface that comprises a plurality of flight sections, and means for identifying a flight path that allows an aircraft, when following the flight path, to conduct an operation over each flight section.

Another embodiment provides a system for supporting aerial operation, comprising a processor, means for instructing an aircraft to fly along a flight path over a surface and means for making an adjustment to the flight path, wherein the adjustment is selected from the group consisting of avoiding an obstacle, adapting to a change of an environmental condition, receiving a supply, and the combination thereof.

Features of the present disclosure can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Features of the disclosure may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

The invention claimed is:

1. A method for supporting aerial operation over a surface, comprising:
    obtaining a three-dimensional (3D) representation of the surface;
    converting the 3D representation of the surface to a two-dimensional (2D) representation of the surface;
    obtaining a 2D flight path of the aircraft based on the 2D representation of the surface;
    converting the 2D flight path to a 3D flight path including location coordinates; and
    controlling the aircraft to conduct a task following the 3D flight path, including:
        controlling the aircraft to fly based on the 3D flight path.

2. The method of claim 1, wherein obtaining the 2D flight path includes:
    obtaining the 2D flight path further according to an environmental factor;
    wherein the environmental factor includes one or more selected from a group consisting of wind, temperature, humidity, and pressure.

3. The method of claim 1, further comprising:
    adjusting the 3D flight path based on a change of one or more environmental conditions.

4. The method of claim 1, wherein the surface includes a plurality of flight sections.

5. The method of claim 4, wherein at least two of the plurality of flight sections share a border with each other.

6. The method of claim 4, wherein controlling the aircraft to conduct the task further includes:
    controlling the aircraft to conduct an operation over the plurality of flight sections of the surface.

7. The method of claim 6, wherein the surface includes:
    at least one operation area that allows the aircraft to fly over to conduct the operation, and
    at least one obstacle area that the aircraft needs to avoid.

8. The method of claim 7, wherein the surface further includes:
    at least one non-operation area that allows the aircraft to fly over but does not require the operation.

9. The method of claim 7, wherein the plurality flight sections are separated into flight section groups each being bounded by at least one of:
    one or more of edges of the operation area,
    one or more of edges of the obstacle area, or
    one or more lines each being tangential to at least one of the edges of the operation area or one of the edges of the obstacle area.

10. The method of claim 9, wherein the 2D flight path connects the flight section groups.

11. The method of claim 6, wherein the operation includes dispensing a dispensable substance or conducting a survey over the plurality of flight sections.

12. The method of claim 11, wherein the dispensable substance is selected from a group consisting of a nutrient, a seed, a pesticide, and a chemical fire extinguisher.

13. The method of claim 4, further comprising:
    determining a coverage width of one of the plurality of flight sections based on at least one of an altitude of a flight, a type of the aircraft, or a type of a dispensable substance.

14. The method of claim 13, wherein the plurality of flight sections have an approximately identical coverage width.

15. The method of claim 14, wherein the coverage width is smaller than an operation width that the aircraft conducts the operation on.

16. The method of claim 15, wherein the coverage width is 1% to 20% smaller than the operation width.

17. The method of claim 4, wherein a first flight section of the plurality of flight sections overlaps with a second flight section of the plurality of flight sections that is adjacent to the first flight section.

18. The method of claim 17, wherein the first flight section overlaps with the second flight section for 1% to 20% of a width of the second flight section.

19. The method of claim 1, further comprising:
receiving a location of a power supply station, wherein the flight path goes through the location of the power supply station.

20. The method of claim 19, wherein the location of the power supply station comprises a track on which the power supply station is allowed to move.

\* \* \* \* \*